(12) United States Patent  
Wistendahl et al.

(10) Patent No.: US 7,577,978 B1  
(45) Date of Patent: Aug. 18, 2009

(54) SYSTEM FOR CONVERTING TV CONTENT TO INTERACTIVE TV GAME PROGRAM OPERATED WITH A STANDARD REMOTE CONTROL AND TV SET-TOP BOX

(76) Inventors: Douglass A. Wistendahl, 1557 Yarrow Cir., Bellport, NY (US) 11713; Leighton K. Chong, 133 Kaai St., Honolulu, HI (US) 96821

( * ) Notice: Subject to any disclaimer, the term of this patent is extended or adjusted under 35 U.S.C. 154(b) by 811 days.

(21) Appl. No.: 10/463,949

(22) Filed: Jun. 16, 2003

Related U.S. Application Data

(63) Continuation-in-part of application No. 09/815,020, filed on Mar. 21, 2001.

(60) Provisional application No. 60/191,139, filed on Mar. 22, 2000.

(51) Int. Cl.  
*H04N 7/173* (2006.01)

(52) U.S. Cl. .................. 725/113; 725/109; 725/110; 725/111; 725/112; 725/135; 725/136

(58) Field of Classification Search ......... 725/109–113, 725/135–136  
See application file for complete search history.

(56) References Cited

U.S. PATENT DOCUMENTS

| | | | |
|---|---|---|---|
| 5,065,345 A | 11/1991 | Knowles et al. | 395/154 |
| 5,109,482 A | 4/1992 | Bohrman | 395/154 |

(Continued)

OTHER PUBLICATIONS

ASSET-2 Publication, additional pages entitled Real-Time Implementation of ASSET-2, U.K. Defense Research Agency, 1995.

(Continued)

*Primary Examiner*—Brian T Pendleton  
*Assistant Examiner*—Nnenna N Ekpo  
(74) *Attorney, Agent, or Firm*—McDonnell Boehnen Hulbert & Berghoff LLP

(57) ABSTRACT

A system for converting TV content to an interactive TV game program uses viewer input pointing to "hot spot" objects in TV programs to enter answers in the game program. Viewers can point to hot spot objects whose locations are mapped in the image display frames of a TV program using a standard remote control and TV set-top box. In a preferred embodiment, the interactive TV game program is a crossword puzzle game offered through the TV's electronic program guide (EPG). Correct answers to the crossword puzzle clues can be entered by linkages from corresponding hot spot objects found in TV movies, ads, video spots, and other types of TV programs on the TV channels. Upon finding a hot spot object that corresponds to a correct answer, the viewer can use the directional arrow keys and "Select" or "Enter" key of the remote control to "click" on the object in the image display frame, and the corresponding answer is entered in the crossword puzzle being played, such as by changing transparent text overlaid on the grid of the crossword puzzle to a darkened color on the viewer's TV display, thus fixing the answer in the crossword puzzle. The viewer can enable "clue helpers" such as on-screen prompts or highlighting of clue answers to facilitate play. A viewer who does not use "clue helpers" may receive a higher score for each clue answer correctly found. Upon successful completion of the crossword puzzle, an "Award Page" can be displayed offering viewers prizes, premiums or other information.

17 Claims, 13 Drawing Sheets

U.S. PATENT DOCUMENTS

| | | | |
|---|---|---|---|
| 5,204,947 A | 4/1993 | Bernstein et al. | 395/157 |
| 5,319,455 A | 6/1994 | Hoarty et al. | 348/7 |
| 5,393,073 A | 2/1995 | Best | |
| 5,442,390 A | 8/1995 | Hooper et al. | |
| 5,453,779 A | 9/1995 | Dan et al. | |
| 5,461,415 A | 10/1995 | Wolf et al. | |
| 5,524,195 A * | 6/1996 | Clanton, III et al. | 725/39 |
| 5,528,513 A | 6/1996 | Vaitzblit et al. | |
| 5,539,871 A | 7/1996 | Gibson | 395/154 |
| 5,596,705 A | 1/1997 | Reimer et al. | |
| 5,667,438 A * | 9/1997 | Rehm | 463/9 |
| 5,758,072 A * | 5/1998 | Filepp et al. | 709/220 |
| 5,822,123 A * | 10/1998 | Davis et al. | 348/564 |
| 5,969,715 A * | 10/1999 | Dougherty et al. | 345/327 |
| 5,990,927 A * | 11/1999 | Hendricks et al. | 725/132 |
| 6,233,734 B1 * | 5/2001 | Macrae et al. | 725/50 |
| 6,392,674 B1 * | 5/2002 | Hiraki et al. | 715/857 |
| 6,501,514 B1 * | 12/2002 | Townsend et al. | 348/734 |
| 6,964,608 B1 * | 11/2005 | Koza | 463/9 |
| 7,139,970 B2 * | 11/2006 | Michaud et al. | 715/501.1 |

OTHER PUBLICATIONS

"Interactive Television", W/ Hodge, Mc-Graw-Hill, 1995, Table of Contents, pp. 13-19, 153-160.

Elastic Reality software, ad from B&H Photo-Video catalog, and attached pages from Chs. 7, 11, and 12 of manual.

Tracy Valleau's LinksWare, marketing material on LinksWare software, dated Jul. 1, 1995, from tracy@linksware.com.

ASSET-2 Motion Segmentation and Object Tracking System, introduction and overview, publ. by Defense Research Agency, U.K.

"AVI Files With Hotspots", David A. Feinleib, Aug. 8, 1993, Microsoft Corp., publ. in Development Library CD-ROM, Microsoft Developers' Network, 1994.

"Multimedia Hypervideo Links for Full Motion Video". IBM Technical Disclosure Bulletin, vol. 37, No. 04A, Apr. 1994.

"Comprehensive guide for Multimedia Technologists", W. Hodges, Ch. 1, 2, and 11, publ. McGraw-Hill, 1995.

"Time-varying Sensitive Regions in Dynamic Multimedia Objects", V. Burril et al., Information and Software Technology, vol. 36, No. 4, pp. 213-223, publ. Butterworth Heinemann Ltd., 1994.

* cited by examiner

FIG. 7A
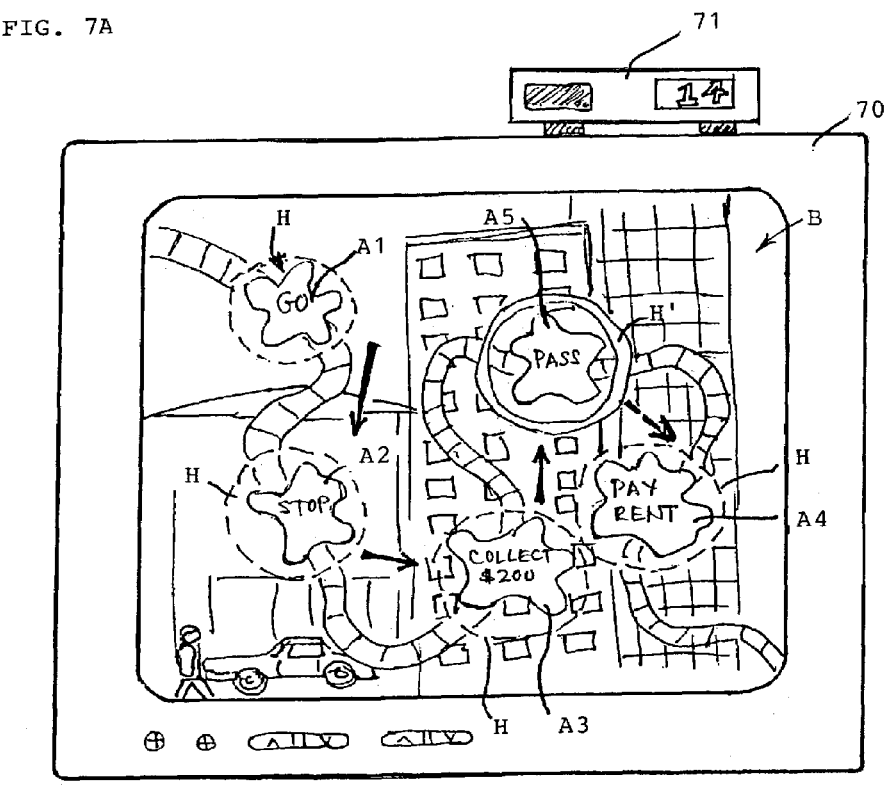
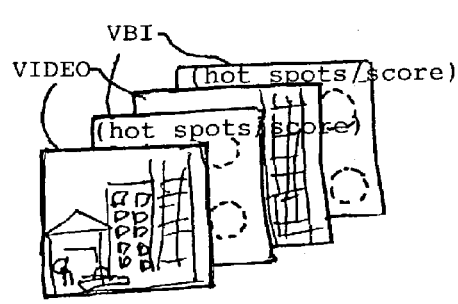
FIG. 7B
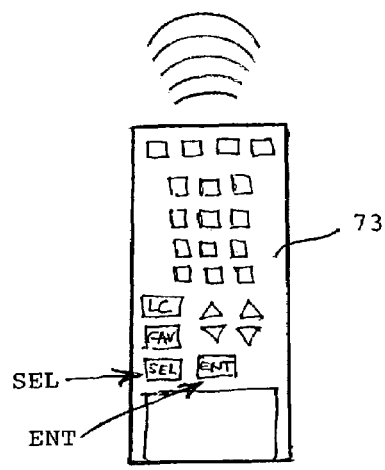

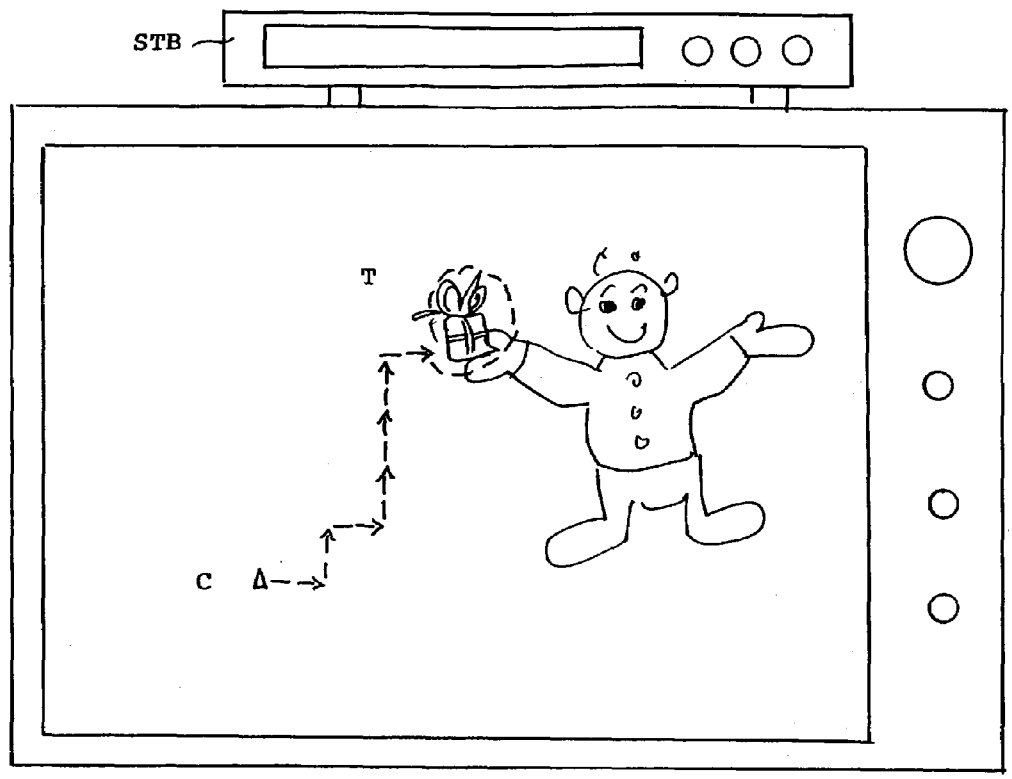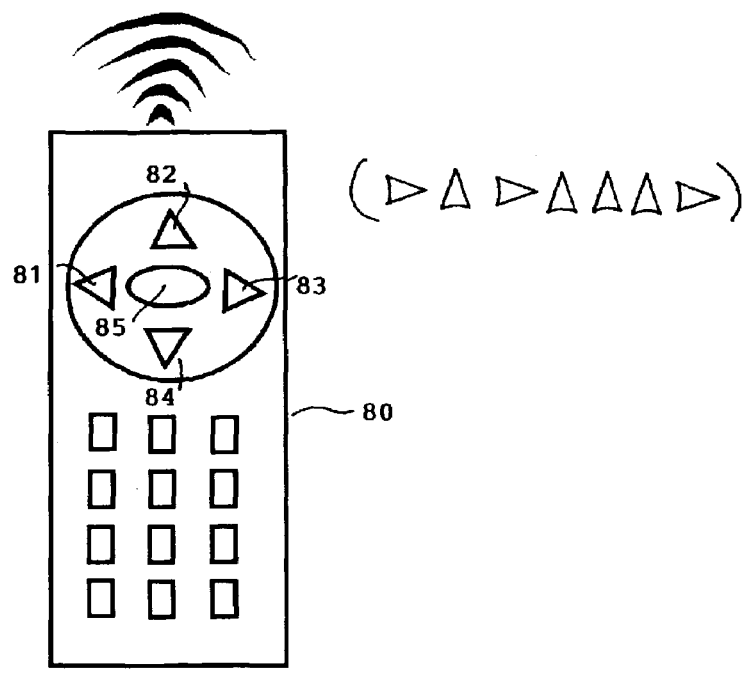
FIG. 8

FIG. 11

Digital CABLE — Crosswords — 12:01PM — TV GUIDE

Tonight on CBS 8pm/9c — Tom Hanks Forrest Gump

Crossword grid:
- CA
- NIKE
- M O W
- PEPPER
- E (M) = Movie Clue
Across clue
1. [Clue]
3. Goddess of victory (M)
6. [Clue]
7. Chill _ _ _ _ _ MD (M)

(C) = Commercial Clue
Down clue
1. No _ _ _ do (C)
2. [Clue]
4. [Clue]
5. Cuts grass (M)

PLAY  DEMO

To complete the puzzle:
Watch shows and commercials.
Click clues with your remote.
Check results here.
Win prizes.

110 — Start game. See results. Win prizes.

111 — Ads for shows and spots with clues.

Buy TV Guide or go to crosswords.com for a paper copy of the puzzle.

WATCH  CLUE HELPER ON  RECORD

SYSTEM FOR CONVERTING TV CONTENT TO INTERACTIVE TV GAME PROGRAM OPERATED WITH A STANDARD REMOTE CONTROL AND TV SET-TOP BOX

This patent application is a continuation-in-part from U.S. patent application Ser. No. 09/815,020 filed Mar. 21, 2001, which claimed the priority filing benefit of U.S. Provisional Application 60/191,139 filed on Mar. 22, 2000, and co-pending U.S. patent application Ser. No. 08/933,666, filed Sep. 19, 1997, issued as U.S. Pat. No. 6,496,981 on Dec. 17, 2002, which was a continuation-in-part from PCT International Application PCT/US96/15437 filed on Sep. 26, 1996 as an international application originating in the United States under 35 U.S.C. 351(d), and from U.S. Patent Application 536,107, filed Sep. 29, 1995, issued as U.S. Pat. No. 5,708,845 on Jan. 13, 1998.

FIELD OF THE INVENTION

This invention relates to the field of interactive TV systems, and particularly to a system for converting TV content to an interactive TV game program which can be operated using a standard remote control and TV set-top box.

BACKGROUND ART

Interactive TV has held out the promise of richly interactive viewer experiences and, at the same time, enhanced capabilities for advertisers and vendors to reach targeted audiences and even individual viewers. However, despite many attempts to deliver interactive TV programs and services to TV viewers, obtaining a critical mass of public viewer interest has proved to be daunting. Some companies, such as WebTV and AOL-TV, have attempted to deliver Internet content with PC-type interactivity alongside or as an alternative to regular TV programs through cable TV or satellite TV links to advanced digital set-top boxes (STBs) operated with wireless keyboards and mouse controls. The general public has been slow to accept these types of interactive TV systems because of the high cost of purchasing the STB units and ongoing costs for online service. Moreover, Internet-based content tends to require active viewer navigation and direction, which is fundamentally different from the passive entertainment experience most viewers seem to prefer with regular TV programs. Other companies, such as Liberate and OpenTV, have attempted to offer a platform for delivering various interactive services on the TV, such as email, Internet surfing, local directories, online purchasing, electronic TV program guides, etc., on the peripheries of regular TV programming. Viewer response to the availability of such TV-based interactive services has been growing, but has been tempered by the availability of many other delivery channels for online services, coupled with the lack of compelling experiences that can be delivered by interactive TV.

The lack of compelling interactive TV programming or advertising appears to be the result of two thorny problems. One is the inertia of the TV programming and advertising production companies to produce TV content in the traditional way, i.e., as stories, ads, and other types of narrative scripts filmed with live actors which are intended to be viewed passively as entertainment. These industries will not underwrite the huge costs of producing and promoting new types of interactive content unless there is a clear demand for them by the viewing public. The other problem is the mindset of the TV hardware, middleware, and software programming industries that new types of interactive TV content must be delivered with new types of advanced digital platforms, user input devices and interfaces, Internet-based or PC-based content, and/or broadband connectivity. Viewers have resisted such attempts to foist new equipment, programming, or connectivity costs on them through their familiar and largely cost-free TV appliance in the absence of any critical mass of truly compelling interactive TV content. These problems have resulted in a deadlock that has prevented the advancement of the promise of interactive TV.

Finding an inexpensive way for existing production companies to produce compelling interactive TV content and for TV multi-service operators (MSOs) to deliver it to TV viewers without imposing large new costs on them is thus the key to the advancement of interactive TV. Interactive TV content can be produced inexpensively by existing TV production companies without radically changing their existing production methods by taking advantage of the vast base of existing non-interactive programs produced by such companies and converting them to interactive media programs.

In our U.S. Pat. No. 5,708,845 issued on Jan. 13, 1998, we disclosed a method for readily converting existing media content to interactive media content by defining "hot spots" on a TV display of content and triggering an interactive response (new video sequence, pop-up message, graphic effects, etc.) when a viewer "clicks" on the "hot spots", which is incorporated herein by reference.

In our U.S. Pat. No. 6,496,981 issued on Dec. 17, 2002, we further disclosed a method of detecting and processing a viewer's pressing of directional arrow buttons on a standard remote control to toggle to "haloed" objects on a TV display to "click" on "hot spots" in an interactive TV program, which is incorporated herein by reference.

In our U.S. patent application Ser. No. 09/815,020 filed on Mar. 21, 2001, we disclosed additional methods for providing a visual interface to a viewer to "click" on "hot spots" in an interactive TV program using a standard remote control with a conventional TV set-top box, which is incorporated herein by reference.

In the present U.S. Patent Application, the invention is directed to a system for converting TV content to an interactive TV game program which can be operated using a standard remote control and TV set-top box. The present invention is intended to solve the following problems with interactive TV systems and content.

Television networks rely heavily on revenues from commercials broadcast to a wide audience, a large portion of which has no interest in buying the advertised goods or services. Accordingly, many viewers avoid commercials when they air ("ad-zapping") by switching to another channel, leaving the room, muting their television or recording programs for later viewing and then "fast-forwarding" through the commercials.

Ad-zapping is not new; however, a recently developed technology featured in some personal video recorders ("PVR") identifies and skips commercials altogether, allowing viewers to watch uninterrupted, commercial-free programming. As a result, advertisers have become increasingly concerned their message will not reach viewers and television networks fear their traditional revenue model will be undermined.

To counter ad-zapping, advertisers spend huge sums to produce commercials they hope viewers will find entertaining enough to watch and air them repeatedly to increase their likelihood of being seen. Some advertisers also pay to have their products displayed within the programming itself as product placements. The resulting bombardment of annoying, irrelevant commercial messages only increases viewers' incentive to ad-zap.

New interactive TV technologies have been developed counter ad-zapping, some of which target and deliver commercials only to viewers most likely to have an interest in the advertised products. Others enable viewers to interact with text overlaid on commercials and request promotional materials, and still others permit viewers to play simple games which feature advertisers' logos or products but are unrelated to TV content or ads.

None of the above solutions offers viewers a compelling reason to watch the targeted or interactive commercials or to play games on their TV instead of on their computer or game console. The invention described in this patent application does both by linking simple iTV games to existing TV programs and commercials. It also provides additional advertising opportunities by using frequently visited EPGs to launch the games and company logos, products or mascots to function as cursors.

SUMMARY OF THE INVENTION

In the present invention, a method (and system) for converting TV content to an interactive TV game program comprises:

(a) providing an interactive TV game program in which a correct answer to a question in the game program is supplied by a viewer finding an object in a TV program (including TV movies, ads, video spots, and the like) transmitted to the viewer in a TV system;

(b) mapping an object as a "hot spot" in an image display frame of the TV program and providing a linkage of the hot spot object to entry of a correct answer in the game program;

(c) receiving input from the viewer through a pointer unit to point at the object in the image display frame of the TV program; and (d) upon receiving the viewer's input correctly pointing at the hot spot object in the image display frame of the TV program, performing the linkage of the hot spot object to enter the correct answer in the game program.

The mapping of hot spots can be used to convert any existing TV program for use in interactive TV games by requiring viewers to find and point at or "click" on objects appearing in TV commercials or in TV movies or shows. The hot spots can be "clicked" on using any standard remote control unit having at least the standard directional arrow functions and a "Select" or "Enter" function. Viewers can thus play stimulating games on their TVs tied to viewing of commercials and TV programs on other channels. MSOs can offer new video services that generate additional advertiser interest and revenues, and can provide new advertisement opportunities in the "Base" or "Home" page such as the electronic program guide ("EPG") used to offer the interactive TV games. Advertisers and sponsors of TV ads and programs can obtain the following advantages:

Advertisers can place ads and links to their promotional materials in the EPG;

To play the games, viewers must watch TV shows and commercials they would otherwise skip, thereby increasing exposure to advertisers' products;

To "click" on objects, the viewers use a cursor that can be configured with the advertiser's logo to be displayed on-screen during regular programming;

To redeem their prizes, viewers can be offered premiums or the opportunity to request additional information about, or to purchase, the advertiser's products or services.

Advertisers and sponsors can receive data relating to viewer's watching habits ("click stream data").

In a preferred embodiment, the interactive TV game is a crossword puzzle game in which correct answers to clues provided in the game are found in TV ads and programs on other channels. Upon finding an object in an ad or program that corresponds to a correct answer, the viewer uses the remote to point to the object, and if it is the correct object, the corresponding answer is entered in the crossword puzzle being played. Each time the viewer "clicks" on a correct answer, the corresponding transparent text overlaid on the grid on the crossword puzzle changes to a color that is darkened on the viewer's TV screen, thus fixing the answer to fill in the puzzle. Text relating to unanswered, or incorrectly answered clues, remain transparent. In games based upon accumulating points for each correct click, the number corresponding to the player's total score appears on the EPG Page for the crossword puzzle. The viewer may enable "clue helpers" such as on-screen prompts or highlighting of clue answers to facilitate play. A viewer who does not use "clue helpers" may receive a higher score for each clue answer correctly found. In this manner, the viewer proceeds to fill in the answers to the crosswords puzzle. Upon successful completion of the crossword puzzle, the EPG Page displays an "Award page" offering viewers prizes, premiums or the opportunity to request additional information about, or to purchase, the advertiser's products or services.

The present invention is described in greater detail below, together with its further objectives, features and advantages, in conjunction with the following drawings:

BRIEF DESCRIPTION OF THE DRAWINGS

FIG. 7a illustrates operation of an interactive TV utility program and remote control to allow a viewer to toggle through hot spots on a display, and FIG. 7b illustrates transmitting secondary TV content for an interactive TV program in the video blanking intervals between video signals.

FIG. 8 is a schematic illustration of use of a modified TV remote control unit as a pointing device through "staircase" cursoring.

FIG. 11 illustrates an example of an on-screen display for an interactive TV game of "Crosswords".

DETAILED DESCRIPTION OF THE INVENTION

The present invention can be used with any system for enabling a TV program to be operated interactively with the user. For purposes of this invention, it is desirable to use an interactive TV enablement system that can be operated using standard types of TV set-top boxes and standard types of remote control units that have cursors directional keys and function keys that can be assigned interactive functions such as "Select" or "Enter". For example, one such type of interactive TV enablement system using standard set-top boxes and remote controls that has been deployed for commercial use is the Wink™ system, offered by Wink Communications, Inc., of Alameda, Calif., now owned by OpenTV Corp., of the British Virgin Islands. A preferred TV enablement system for use in the present invention is as described in our U.S. Pat. Nos. 5,708,845 and 6,496,981, and U.S. patent application Ser. No. 09/815,020, for converting existing TV program content to interactive TV programs by defining "hot spots" of objects in the display images and triggering an interactive response when a viewer "clicks" on the "hot spots". It is to be understood that one familiar with this field may apply the principles of the invention disclosed herein equivalently to other types of interactive TV enablement systems.

Figure 1:
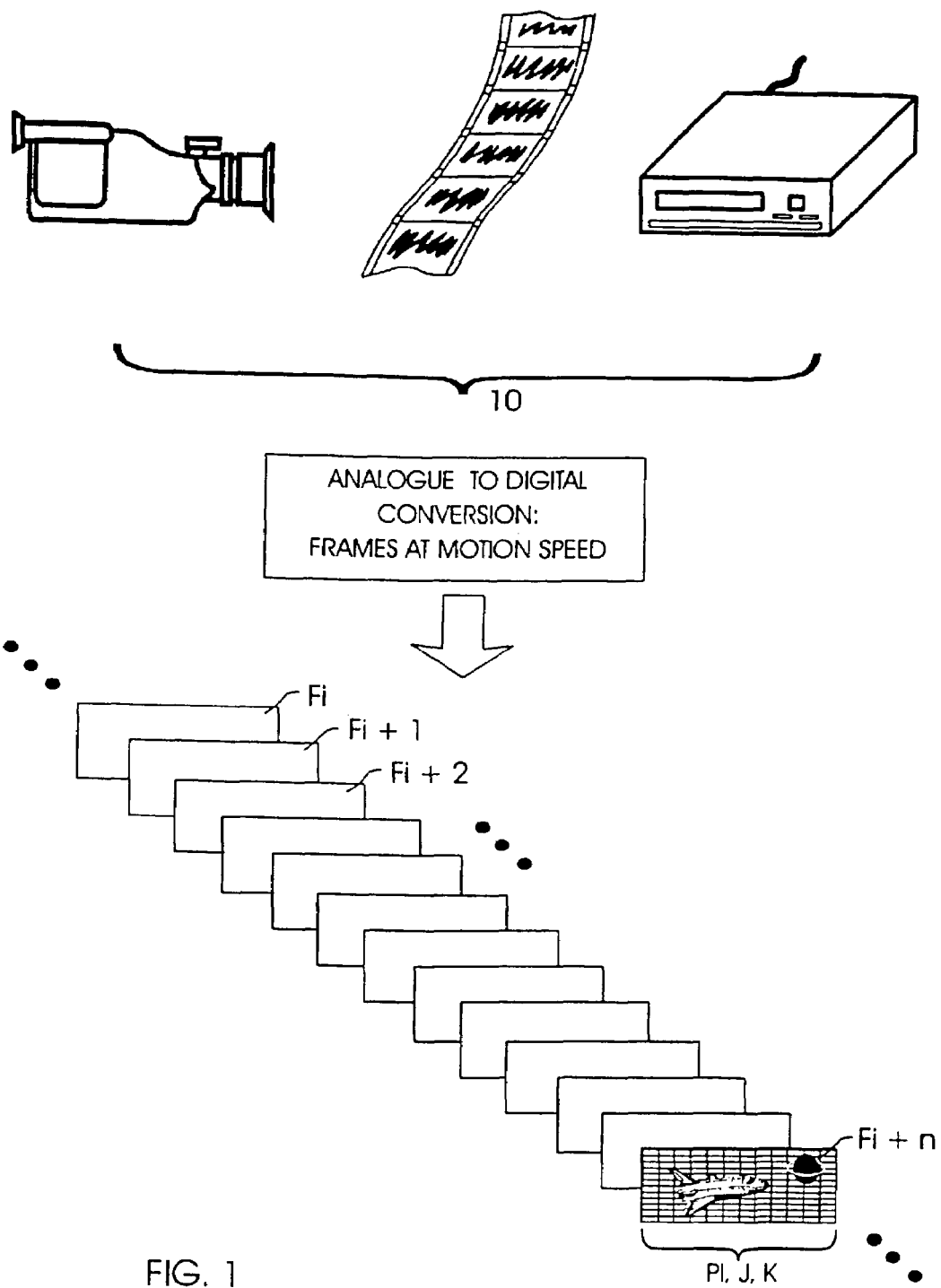
FIG. 1 is a schematic drawing showing the conversion of existing TV content to an interactive TV program.

Referring to FIG. 1, original media content 10, such as a movie, video program, or live television program captured by a video camera, etc., is digitized via an analog-to-digital (A/D) converter 12 into digital data representing a series of display frames $F_i$, $F_{i+2}$, $F_{i+3}$, . . . , in a time sequence t for display on a display screen. Each frame F has a frame address i, i+1, i+2, . . . corresponding to its unique time position in the sequence, and is composed of an array of pixels $p_i$ uniquely defined by location coordinates represented by j rows and k columns in the display area of each frame. The pixels of the frame are also digitally defined with chrominance and luminance values representing their color and brightness levels on the display. For full motion video, a sequence of 30 frames is typically used per second of video.

Figure 2:
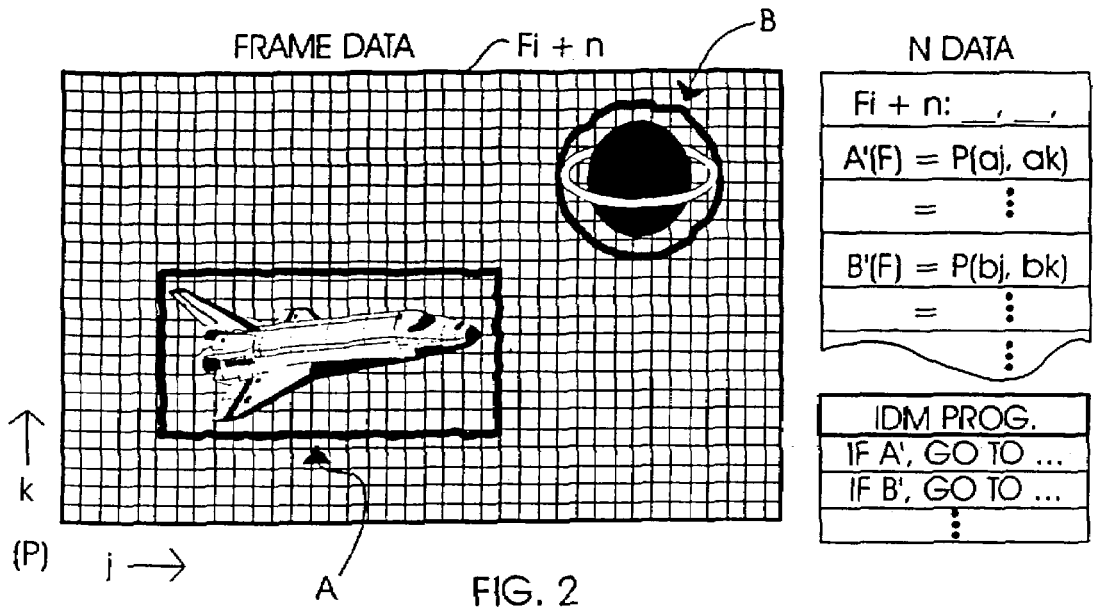
FIG. 2 is a schematic drawing showing the generation of object mapping data designating "hot spots" in a display frame.

In FIG. 2, an individual frame is illustrated showing an image of an object A such as a face next to an object B such as the sun. In interactive use, the user can point at (click on) the face A or the sun B to connect to further information or to a further development in the narrative being presented. The original media content is converted to interactive use without embedding special codes in the digital data for the frames, by mapping the "hot spots" as separate data which are used in an interactive program associated with the media content. Thus, for the frame $F_i$, a "hot spot" area $A'(F_i)$ is mapped for the object A, and a "hot spot" area $B'(F_i)$ is mapped for the object B. The definition of a "hot spot" can be made by defining a set of pixels in the display which comprise an outline around the designated area, e.g., $p(a_j, a_k)$ . . . . Alternatively, the area may be defined by a vector contour encompassing the designated area, or any other suitable array definition method as is well known in the computer graphics field. The display location coordinates of the defined pixels and the frame addresses of the frames in which the area appears are stored separately as object mapping data.

The original media content is thus rendered in the form of a stream of digital data, referred to herein as "Frame Data", which represent the series of display frames F constituting the movie or video sequence. Concurrently, for each frame $F_i$, the object mapping data, referred to herein as "N Data", are generated to define the display location coordinates of designated "hot spot" areas in the frames of the movie or video sequence. The N Data mapping the "hot spots" are maintained as physically or at least logically separate data from the Frame Data for the media content. In this manner, the objects which are rendered interactive in the original media content are tagged for use in a compatible interactive digital media (IDM) program without embedding any proprietary or platform-dependent codes in the media content. Thus, the media content data can be run on any digital media player and the N Data can be used by any IDM program.

The N Data defining the "hot spots" are preferably in a standard industry format for the frame addresses and display location coordinates for the designated objects, as explained further herein. The standard-format N Data can thus be accessed by any interactive digital media (IDM) program written in standard applications programming languages. The N Data define the location of the designated "hot spots" or "anchors" to which hyperlinks are established in the IDM program. This is represented in FIG. 2 by "IDM PROG." which references the "hot spot" N Data values as anchors for hyperlinks to other files or executable functions ("GO TO . . . "). Then when a user clicks on a designated "hot spot" by pointing to any display position encompassed within the area defined by the object mapping data, the IDM program recognizes that the object pointed to has been selected, and consequently causes the other file or function linked to the "hot spot" to be performed.

Interactive digital media programs can be run on any of a wide range of platforms. In various types of media services networks, the media content, N or "hot spot" data, and associated IDM or interactivity program are downloaded via the network to user or subscriber terminals. The following description focuses on the delivery of TV program content, N or "hot spot" data, and TV interactivity program through a cable TV network.

Figure 3:
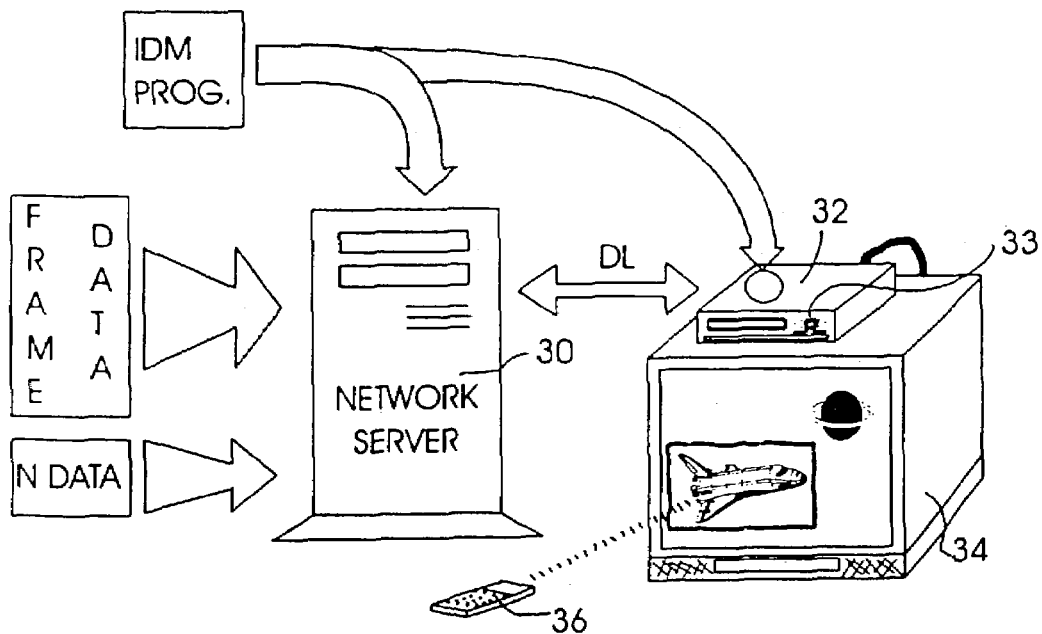
FIG. 3 is a schematic drawing showing transmission of TV content and object mapping data from a cable TV server to a subscriber's TV set top box.

Referring to FIG. 3, a network server 30, such as a head-end server for a cable TV network, provides media services from a node or hub in a company's service area. The server 30 is coupled to subscriber terminals through a suitable data transmission link DL, such as cable wiring, fiber optic lines, telephone wiring, or digital data links. The subscriber's terminal is typically in the form of a "set-top" box 32 connected to the subscribers' TV or screen display 34, but it can also be a computer or other type of terminal. An important concept for network media services is "video-on-demand", wherein the server 30 can access large digital libraries of movies, videos, and other types of media content and transmit them to subscribers upon request. The server 30 transmits both the Frame Data for the TV program and the N (hot spot) Data and IDM (interactivity) program to the subscriber's set-top box 32 via the data transmission link DL. The subscriber uses a remote control device 36 to operate the set. For interactive use, the remote device 36 can include an optical pointer which emits an infrared or other light beam. As known conventionally, a sensor 33 in the set-top box is used to detect the position and angle of the beam from the remote control pointer in order to detect the area of the display 34 being pointed to.

Figure 4:
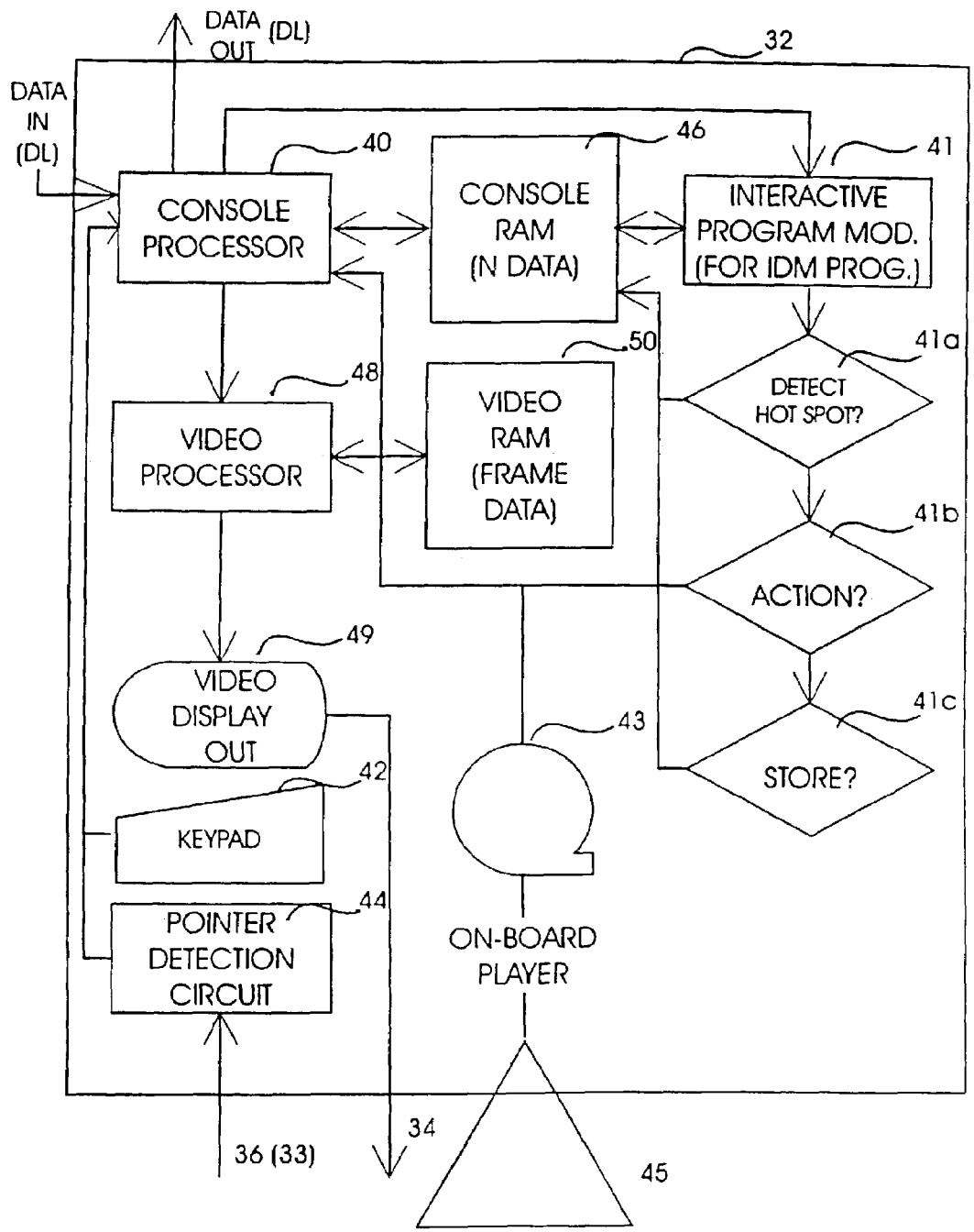
FIG. 4 is a schematic diagram of the components of a set top box for use in conjunction with an interactive TV program.

The TV program with hot spot data delivered to the subscriber's set-top box is operated interactively by the subscriber through the interactivity program. FIG. 4 illustrates schematically how an interactive TV system operates the TV program Frame Data, hot spot data, and interactivity together to provide interactive entertainment. The system uses the aforementioned set-top box 32, display 34, remote control pointer 36, and data link DL to the external network server. An on-board CD-ROM player or other data reading device 43 may also be provided with the set-top box 32 for input of data, indicated at 45, such as by loading from a selected CD or insertable disk or card. Input from the remote control pointer 36 is detected by the sensor 33 on the set-top box and processed to determine its target via a pointer detection circuit 44.

In the principal mode of use, the subscriber inputs a request to the cable TV services company for an interactive TV program through the set-top box 32, such as through menu selection using the remote control pointer 36. For example, the subscriber can request an interactive program "Movie Trivia Info" for the movie "The Maltese Falcon". The interactive program will run the movie while displaying pop-up movie trivia about the stars Humphrey Bogart, Sidney Greenstreet, and Peter Lorre or objects such as the Maltese falcon whenever the user clicks on these "hot spots" appearing in different scenes of the film. To the user, movie viewing which had been a passive experience is rendered interactive so that the user can play trivia games or spark conversations in conjunction with the running of the movie.

A console processor 40 of the set-top box processes the subscriber request and transmits it via the data link DL to the network server 30. In return, the server 30 transmits the interactivity program and hot spot data for "Movie Trivia Info" to the subscriber's set-top box where the console processor 40 stores the data in a console RAM memory 46. The console processor 40 can load and run the interactivity program as a multi-tasking function concurrently with other console functions, as indicated in FIG. 4 by the separate module 41. Alternatively, the interactivity program can run on a separate processor (41) in parallel with the console processor.

After the interactivity program is loaded, the network server 30 begins to transmit the movie as Frame Data to the subscriber's set-top box 32. The Frame Data is routed by the console processor 40 to the video processor 48 and associated video RAM memory 50 which process the display of frames of the movie via video display output 49 to the subscriber's television display 34. Audio processing is subsumed with the video processing and is not shown separately. For typical video-on-demand servers, a requested movie can be transmitted to the subscriber as a series of 30-second movie blocks within a 6-minute start of a request. The video processor coordinates the receipt of the blocks of transmitted data into a display of video output which the user sees as a continuous movie.

As designed for interactive TV systems, the remote control 36 includes an optical pointer for digitally pointing to objects displayed on the television screen. As the movie runs, the user can point the remote control pointer 36 to a designated actor or object appearing on the television display and click on the desired object. The not spot data defines the area encompassing an object in the display frame as a "hot spot". Clicking the remote control on the hot spot results in detection of the hot spot location by the detector module 44. The hot spot's location is compared, at box 41a, by the interactivity program to the mapping of "hot spots" stored in memory to identify which "hot spot" has been selected, and then the program executes the response programmed for that "hot spot", as indicated at box 41b.

For example, the interactive response may be to display trivia information about the actor or object clicked on. The interactivity module retrieves the trivia information stored with the interactivity program in memory and sends it to the console processor 40 to process a corresponding pop-up window, overlay display, audio track, etc., in conjunction with the movie. To illustrate, upon the user clicking on the Maltese falcon, the link to the hot spot established in the "Movie Trivia Info" program can initiate a display of text or graphics explaining the Maltese origins of the falcon in a pop-up window on the television screen, or may execute another program function such as initiating an Internet connection to a Web page which offers a replica of the falcon for purchase. In this manner, unlimited types and varieties of interactive actions can be activated for existing TV programs.

As an option, upon selection by a user clicking on an object, the interactivity program can issue an instruction via the console processor 40 to the video processor 48 to slow down or pause the running of the movie to allow time for the user to absorb the interactivity program's response. Alternatively, the user may wish to bypass the response and store it to be reviewed after the movie is finished. By clicking with the remote control 36 on a "Save" button displayed on-screen, the particular scene location and clicked object and/or its linked response can be saved in the console RAM 46 for retrieval during a Review mode of the interactivity program, as indicated at box 41c in FIG. 4.

The mapping of "hot spots" or objects appearing in original TV program content to enable the operation of an interactivity program is referred to as "authoring". Many types of TV and video authoring tools are widely available. An example of authoring software for video programs is the PREMIER™ system offered by Adobe Systems, Inc., of Mountain View, Calif., which has editing tools that can be used for hot spot mapping. Video editing software such as ELASTIC REALITY 3™ offered by Elastic Reality, Inc., of Madison, Wis., has shape creation and compositing tools which can outline a shape in an image field and store the shape data as a separate file.

Figure 5A:
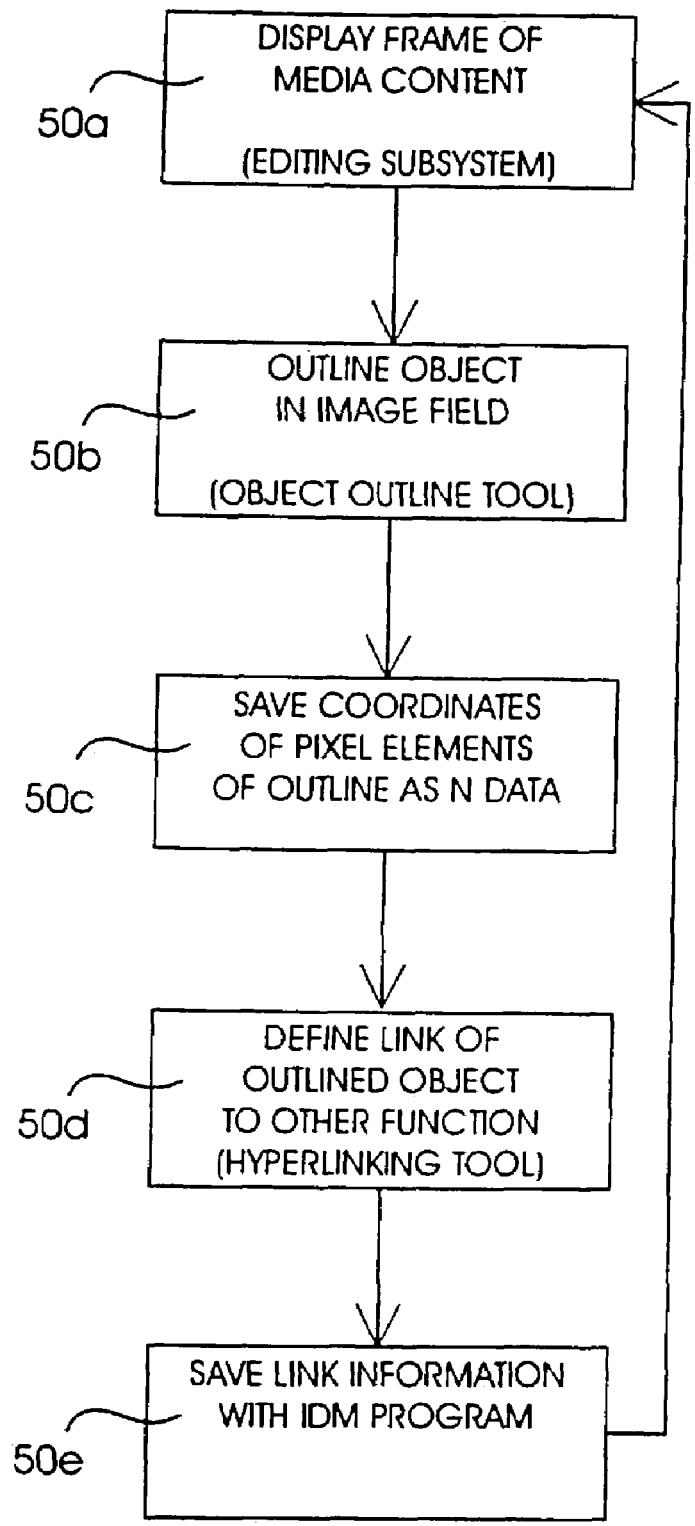
FIG. 5A is a procedural diagram for an object mapping tool for generating N Data for objects in a display frame.

An example of a procedural sequence for using an object mapping tool in an authoring system is shown in the diagram of FIG. 5A. First, a display frame of the media content is called up on the editing subsystem, as indicated at box 50a. Using an outlining tool similar to that provided in the ELASTIC REALITY 3™ software, the author can draw an outline around an object in the image field using a pointer or other cursor device, as indicated at box 50b. The outline, i.e., the display location coordinates of the pixel elements constituting the outline, and the frame address are saved as N Data at box 50c. Then using a linking tool, the author can define a link between the object outlined, now specified as N Data, and another function to be performed by the interactivity program, as indicated at box 50d. The link information is saved with the interactivity program at box 50e. The procedure is iterated for all objects to be mapped in a frame and for all frames of the movie or video. The interactivity program can be stored together with the hot spot data or separately, depending upon whether the hot spot data is for dedicated use or multi-use.

The object mapping function can use the same outline data of one frame for succeeding frames if the object appears in the same position in the other frames, i.e., is non-moving. This saves the author from having to draw the same outline in the other frames. Even further, the outline data of a non-moving object appearing in a first frame can be stored with only the frame address of the last frame in a sequence in which the object appears unchanged in order to compress the hot spot data required to map the object over the sequence of frames. The interactivity program can later uncompress the hot spot data and use the same outline data for the sequence of frames.

Figure 5B:
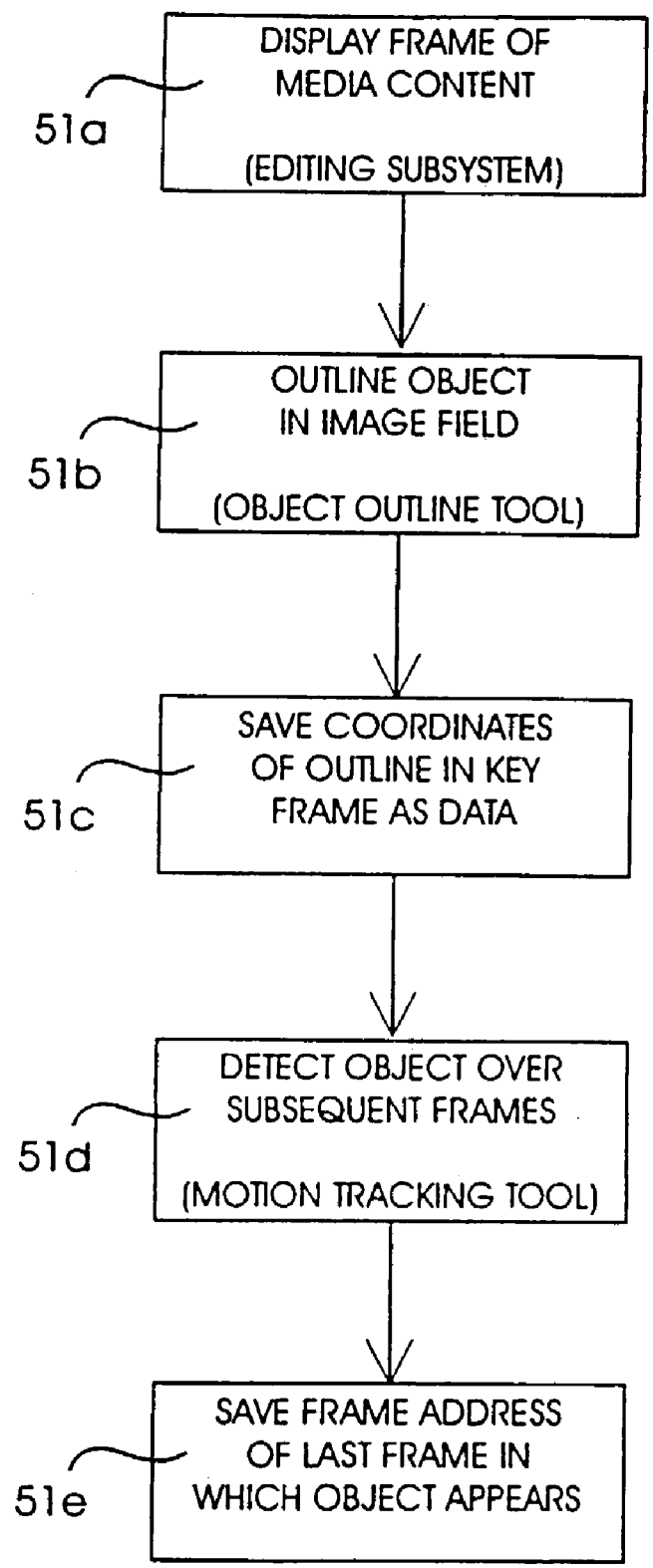
FIG. 5B is a procedural diagram for an object motion tracking tool for generating N Data for objects in motion over a sequence of display frames.

The object mapping procedures can include a motion tracking tool for automatically generating hot spot data for an unchanging object in motion across a sequence of frames. It will be appreciated that the mapping of a number of "hot spots" in each frame of a full motion video sequence or movie which may run from a few minutes to a few hours duration can be a hugely laborious task. Motion tracking techniques have been developed and widely used in this field, and need not be described in further detail herein. An example of a procedural sequence for using a motion tracking tool in an authoring system is shown in the diagram of FIG. 5B. First, a display frame of the media content is called up on the editing subsystem, as indicated at box 51a. Using an outlining tool as before, the author draws an outline around an object and marks its position as it appears in a first or "key" frame, as indicated at box 51b. The outline data, position, and frame address are saved as hot spot data at box 51c. Then, a motion tracking tool is used to detect the image of the object as it moves across subsequent frames at box 51d, until a last frame in which the object is detected is reached. The position of the object and frame address of the last frame in the sequence are then saved as hot spot data at box 51e. The use of the motion tracking tool saves the author from having to draw the outline around the object in each frame of the sequence, and also compresses the amount of hot spot data required to specify the mapping of the object in those frames.

Figure 5C:
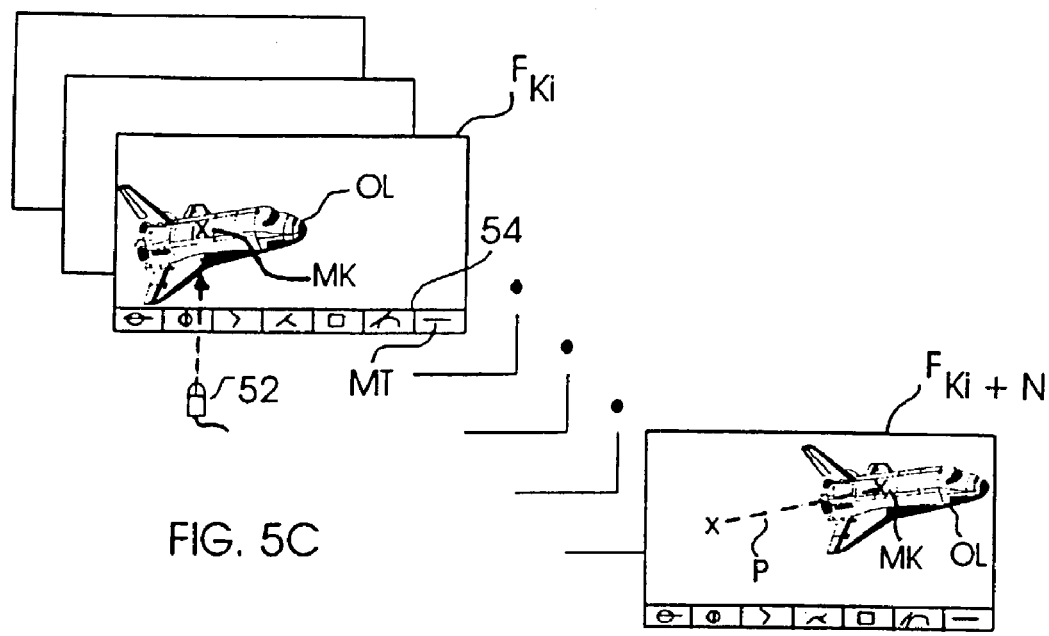
FIG. 5c illustrates use of the mapping and motion tracking tools for automatically generating N Data for an object in motion.

The use of the motion tracking tool for hot spot data generation is illustrated in FIG. 5C. The author first brings up a key frame $F_{Ki}$ of a series of frames of a full motion movie or video sequence. Using a mouse or other type of pointing device 52, the author delineates an object in the key frame, such as the airplane shown in frame $F_{Ki}$, by drawing an outline OL around the airplane. The author also marks the position of the object in the key frame by designating a marker MK in a central position within the outline OL in frame $F_{Ki}$. The author then runs the motion tracking tool by clicking on an MT button of a tool bar 54 in a graphical interface for the authoring program. The motion tracking function operates to identify the object indicated to be within the outline OL in frame $F_{Ki}$ where it appears in the succeeding frames of the sequence until a last frame $F_{Ki+N}$ is reached in which the object is detected. The outline data and position of the object in the key frame and the position and frame address of the last frame are stored as hot spot data by the authoring system.

Alternatively, the authoring system can use a conventional editing tool for advancing through a sequence of frames and marking the position of the object as it moves across the frames until a last frame is reached. This allows a path P of motion to be specified in terms of the progression of positions of the marker MK for the object. For motion that follows a straight line or simple curve, the author can simply mark the outline OL and the marker MK in frame $F_{Ki}$ and mark the end position of the marker MK in a selected frame N steps removed from the key frame. Smooth motion to the human eye can be approximated well by a display of image frames at the rate of about 30 frames/second. A typical selection for the number N of frames for following an object in motion smoothly might be an interval of 15 (0.5 second), 30 (full second), up to 60 (2 seconds) frames or more. The author thus advances to frame FKI+N and marks the position of the object in that frame. The path P can then be automatically filled in using a typical "in-betweening" function commonly provided in video editing software. The outline and the path data are then stored as hot spot data.

Figure 6:
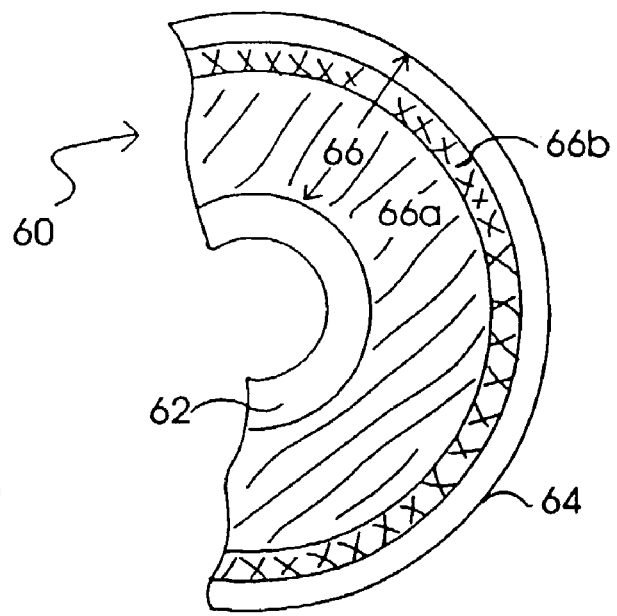
FIG. 6 is a schematic illustration of a disk storage format for TV content and object mapping data for an interactive TV video program on disk

For interactive video products, the program content and hot spot data (with or without the interactivity program may also be recorded on a storage disk. An example of such a disk 60 is shown in FIG. 6 having a center hub 62 and an outer edge 64 with an optically readable data space 66 therebetween. Digital data for programs, sound tracks, video sequences, movies, etc., are typically stored as optically readable marks representing binary is and Os in the data space 66. For media of smaller total data volume, e.g., 640 megabytes and under, the industry standard is a compact disc or CD which is written on one side. For larger data volumes up to 10 gigabytes and higher, such as for full-length movies and videos, DVD and new disk formats of greater storage capacity are being developed. Isolating the hot spot data from the media program data allows the disk to be used both in new players which can utilize the hot spot data for interactive programs, as well as in conventional players which can only play back the original (non-interactive) media content. Using data compression techniques as described above, the hot spot data for media content of even a long duration can fit in a relatively small data space, thereby taking up only a small percentage of the total disk space.

Also described herein are various options for converting existing TV programs into interactive TV programs that can be operated with the standard directional arrow buttons on a standard remote control. Use of existing TV programs allows TV production companies to avoid the huge costs of creating new interactive content ahead of generating a critical mass of viewer interest to justify those costs. Use of existing set-top boxes and remote controls avoids imposing huge new infrastructure, conversion, marketing, and customer support costs on MSOs. And it allows the viewing public to become familiar with the benefits and excitement of interactive TV programs without having to purchase expensive new equipment or radically change their TV viewing habits.

For example, home shopping shows can be rendered interactive by mapping the products displayed on the TV screen as hot spots to allow switching to or overlaying (in a window) additional information or follow-on options about the product selected by the viewer. The viewer's set top box can be downloaded with a stored product interaction program to perform basic functions expected for advertisements, infomercials, and home shopping shows, for example, sending a response back that the viewer is interested in buying the product or obtaining more information about it, displaying additional text and graphics concerning the product, or connecting to a related Web page on the Internet.

As another example, a TV program filmed live or transmitted on a taped delay may feature a number of speakers or entertainers. Rendering the talk show interactive can allow viewers to send responses back to the show or to obtain more information or trivia comments about the speakers or entertainers. Hot spot data mapping the speakers on the TV display can be downloaded with the TV program to the viewer's set top box. During the show, the viewer can click on one of the speakers, and the hot spot will trigger an interactive function, such as displaying the speaker's biography in a window, or send a vote supporting the speaker's viewpoint back to the show. If the set top box supports viewer input via a keyboard and has a modem connection, an on-line response can be sent by the viewer to the show.

As a further example, existing video content such as a music video can be enhanced with overlays of graphics, buttons, and other objects to be displayed, for example, as pop-up quotes or trivia questions or game-oriented graphics in conjunction with the music video. The overlays may be edited onto the original music video using standard multimedia or video editing tools, for example the Macromedia Director™ program. The enhanced TV content can then be rendered as an interactive TV program by mapping selected image and/or added (non-image) objects as hot spots, and transmitting the hot spot data to the viewer's set top box along with the enhanced TV content.

Conventional cable TV systems widely used in many multi-service operator (MSO) service areas in the U.S. transmits TV programs in digital MPEG-2 compression format converted from analog media content. The MPEG-2 digital data are received by the subscriber's set-top box and converted to analog TV signals to generate the screen display in conventional (analog) TV sets. A standard type of set-top box in common use, such as the DCT-2000 or 2200 manufactured by Next Level, Inc., formerly General Instruments Corp., Philadelphia, Pa., includes a small microprocessor unit MPU and RAM memory and other components for handling basic programmed functions to be performed by the set-top box. The MPU can be re-programmed to perform other functions by downloading a software program to the set-top box through the cable line connection. In this manner, an interactivity program for detecting viewer's "clicks" on "hot spots" in the display of the underlying TV program and generating the pre-programmed interactive response can be downloaded to the conventional set-top box and used to create the interactive effects in conjunction with display of the underlying TV program. Advanced digital set top boxes on two-way high-bandwidth cable TV networks are expected to be widely deployed in the future and will have much greater capability to handle more complex and experientially rich interactive TV programs.

Referring to FIG. 7a, an example of an interactive TV program is shown displayed on a conventional TV set 70 connected by a conventional set top box 71 to a cable TV system. An interactive TV program is downloaded to the set top box 71 which consists of a defined set of functions that can be called to perform the various interactive functions of the interactive TV program. The interactive TV program displays an image B of a city with buttons A1, A2, A3, A4, A5 representing game options for an interactive game to be played by the viewer in conjunction with the story conveyed by the background image. The available game option buttons are "hot spots" identified visually for the viewer by a halo H displayed around the buttons. The halo H can be generated by a supplementary TV signal sent to the TV set's CRT gun to illuminate the area at the defined position of the "hot spot".

Using a conventional TV remote control 73, the viewer can select one of the game options by toggling through them in sequence, for example, by pressing the "Select" key on the remote. As the viewer toggles through the options, the halo H is brightened, as shown with highlighted halo H' for button A5, in order to identify the currently toggled button for the viewer. The viewer can select a currently toggled button by pressing the "Enter" key, for example, on the remote. This may result, for example, in an interactive effect such as a display to the viewer of a funny response or a score assigned to that button. A tally of the viewer's score is maintained by the interactivity program executed by the processor in the set top box 71. After the game is completed, the viewer's total score can be transmitted to the cable company's headend server, where it is recorded with the scores from other viewers on an output listing that is sent on to the sponsor of the interactive TV game. The sponsor can then send notification of a prize to the winner of the game.

Referring to FIG. 7b, an example is shown how interactive effects can be generated in the interactive TV program. The main sequence of the interactive TV game is represented schematically as a series of video signal frames VIDEO in time-indexed order (t). Conventional TV signals are transmitted at the rate of 30 frames per second. In between the VIDEO frames intervals referred to as video blanking intervals VBI which can be used to transmit secondary TV signals to the viewer's set top box. In older TV sets, the TV signals are transmitted as analog TV signals for each frame of the display, and the VBI is a blank interval between analog TV signals which may be used to transmit other analog signals as alternate TV frames or as analog signals that can be converted to digital data. In the example shown, the background image B of the city as video content are transmitted in the VIDEO frames, while the hot spot data identifying the positions of the available game option buttons A1, A2, A3, A4, A5 on the display are transmitted in the VBI along with the interactive displays of the response or score obtained in that game segment. The hot spot data may be in the form of coordinate locations of the buttons. The hot spot data are stored and halos generated by the IDM utility loaded in the set top box. Alternatively, the hot spots may be in the form of screen overlays of the buttons and halos in their respective positions.

The frames of video signals may be time-addressed using the SMPTE time code synchronization protocol widely used in the television and motion picture industry. SMPTE Time Code provides a unique time address for each frame of a video signal. This address is standardized as an eight-digit number based on the 24-hour clock in hours, minutes, and seconds and the video frame rate per second. There are four standard frame rates (frames per second) that apply to SMPTE Time Code: 24, 25, 30, and 30 "Drop Frame". SMPTE time code can be recorded as digital signals recorded longitudinally on a track of an audio or video tape or recording media, or can be encoded in the video signal frame-by-frame during the vertical blanking interval VBI between frames. If the SMPTE Time Code is not transmitted with the video signal, it can be supplied by the equipment that processes the received video signal which, in this case, is the interactive TV utility stored in the set top box.

The interactive TV program can thus be supplied through existing cable TV channels by sending the TV content in the VIDEO frames and the hot spot data and interactive displays data (indexed to SMPTE Time Code) in the VBI to the viewer's set top box. Alternatively, the hot spot data and interactive displays can be transmitted on the same cable channel prior to the interactive TV program, or on a separate frequency band, an available side band of the assigned cable TV spectrum, or other distribution channel including an online TCP/IP connection to Internet sources. The interactive use of hot spots with cable TV signals on current cable equipment in widespread use may be limited to pop-up and other overlay effects, since cable TV signals are generally broadcast as streaming, non-interruptible content. More advanced digital set top boxes capable of handling video-on-demand and pay-per-view have VCR-like functions that can pause the TV content and/or bookmark the hot spots, The toggling function can be implemented with conventional cable TV set top boxes and remote controls in a manner similar to that currently used to display and control on-screen menus such as volume control, for example. The on-screen menu is downloaded to the set top box by the cable company as part of the subscriber's cable control package. When the viewer presses a volume control button on the remote control, the volume on-screen menu is displayed on the TV screen superimposed over the TV program currently being viewed.

The usual volume control menu consists of a series of bar segments at fixed position intervals representing the volume level. As the viewer presses the volume-up or volume-down buttons, the display toggles through the bar segments in up or down sequence and highlights the currently toggled segment. In a similar manner, the hot spot objects can be overlaid with halos H and toggled through with highlighting by pressing the "Select" and "Enter" keys on the remote control.

The sponsor or producer of the interactive TV program may use the authoring system described above to generate the hot spot data and interactive functions when creating the enhanced TV content for the interactive TV game. As examples, pre-recorded sports programs, news telecasts, performance telecasts, TV commercials, product infomercials, etc. can be authored with hot spot data using the outlining and tracking functions described above for taped video frames in analog format. Since the hot spot data is maintained logically separate from the TV content, it does not matter what form, signal or file format the TV content is provided in or what set top box system or display platform it is run on. Therefore, the current diversity of sources for generating and distributing media content can continue to be utilized in conjunction with the authoring of interactive TV programs for delivery on conventional cable TV systems.

When TV content is rendered interactive with an IDM program using "hot spot" position data, it may be desirable to stop, pause, rewind, or otherwise control the playback with familiar VCR-like controls to allow the user time to interact with the program, such as for reading information, making choices, inputting information, following a hyperlink from the hot spot, or saving a marked hot spot for later review. VCR-like controls have been developed for use with most types of multimedia systems. For example, in video-on-demand or media-on-demand systems, "streaming" content supplied in segments of digital data packets can be controlled with VCR-like controls by interrupting the content stream upon sending a command from the subscriber and rescheduling the sending of content segments as requested by the subscriber. Such video server scheduling techniques and handling of interactive requests from a video-on-demand network may be used in conjunction with interactive TV programs as described herein.

When a user clicks or points at a hot spot in interactive TV content, it may be desirable to provide a "bookmark" or "frame storage" function so that the user can store the hot spot object for later review and follow up. For systems in which the TV content is supplied locally from a disk or other video player, a bookmark function can be implemented in accordance with known techniques for storing the address of the frame and the position of the hot spot pointed to by the user, for later playback and interactive use in accordance with the IDM program. For cable TV systems having video-on-demand functions, a frame storage function can be implemented with available video console memory to store the entire image frame and hot spot position in RAM for later playback and interactive use.

The locations of hot spots in a display of an interactive TV program can be defined by other measures equivalent to coordinate data. For example, hot spot locations can be defined by vectors or by positions in a "page" equivalent to the display screen. Most attempts to create interactive TV effects have focused on embedding hyperlinks in digital video files, which is the approach specifically avoided herein. Instead, the following describes one alternative method of defining the positions of hot spots by an adjunct definition of "position markers" that are not embedded in the underlying TV content. Advanced TV Enhancement Forum (ATVEF) is a standard for creating HTML-type formatted content that can be delivered to a wide range of television, set-top box, and other display devices over a variety of mediums—including analog (NTSC) and digital (ATSC) television broadcasts—and a variety of networks, including terrestrial broadcast, cable, and satellite. The AVTEF content specification is based around existing Internet technologies such as HTML and JavaScript. For example, a transparent "page" (which could also contain text and graphics) can be created in HTML with the data for the hot spots in the video content being defined in an image map in HTML code. The AVTEF "page" can be processed by the STB's MPU as a hot spot map, or as a transparent screen overlay that is separate from the underlying video content. As a hot spot map, the hot spot position markers in the AVTEF "page" can be parsed by the MPU and used to identify the locations of hot spots in the display of video content. A video signal can then be generated to control the CRT gun to "halo" or highlight the designated positions on the screen. As a screen overlay, the AVTEF "page" can be converted to a video signal as an overlay of haloed or highlighted positions on the underlying video image. The hot spot positions in the AVTEF "page" are computed for a given aspect ratio of screen height and width and resolution of the host TV display. Other systems of HTML-type formatting, such as DVB-HTML, a protocol promoted by Philips Corp. and Sun Microsystems, Inc., Mountain View, Calif., may similarly be used for non-embedded definition of hot spots designated for the underlying TV content.

TV interactivity programs may also be operated in conjunction with cable TV systems that provide Internet connectivity along with media services. For example, the interactivity program can process a link to an external URL, and an external Web page can be retrieved for display in a window superimposed on the underlying TV content. The effect may also be to display a response message, such as informing the viewer of a correct or incorrect selection, or a reward or point tally. The effect can also be to send a response signal to the cable head-end of the viewer's choice from options offered in the display, which is then forwarded to the advertiser or program sponsor for a follow up action or for measuring viewer responses and preferences. The forwarded data can be used by the advertiser or program sponsor for targeted advertising or individualized TV programming directed to the viewer.

The use of formatted HTML-type pages to define "hot spots" for interactive effects can reduce the amount of TV channel bandwidth required to implement "individualized TV". Current proposals for "individualized TV" call for transmitting several simultaneous TV displays or Web pages through a TV channel band to the viewer's TV set, then having one TV display or Web page selected for display by a trigger which is set in the viewer's STB in accordance with the viewer's previously detected demographic type or viewing habits. The viewer's interaction with the individualized display or page is then recorded by the advertiser or sponsor. With the above-described method, a single HMTL-type page can be sent with several hot spot options designated on the display and the viewer's selection can be processed without having to transmit several simultaneous TV programs customized to different viewer demographics.

A converse adaptation of the interactive TV system is to detect the viewers' pointing at objects in a TV display and send them as "reverse hot spots" upstream to the cable head-end, and ultimately to the vendor or advertiser. This would require the use of a mouse or other pointing device, so that the viewer can "click" on a position in the display, and the STB detector program then correlates the screen coordinates of the position pointed at with the program time and frame time code for the TV program being run. This "click-stream" data represents information about what objects the viewer is interested in and can be sent to the program sponsors or advertisers for marketing or programming purposes. More detailed "click-stream" data can thus be generated than is currently available from channel-surfing monitoring systems or systems that merely record a click selection from a drop down menu or grid. The system can also deliver a response message to the TV viewer, such as contact information or prompting the viewer to a further response.

Some producers that may find it valuable to know what viewers are clicking on, with or without hot spots in the program. For example, a TV ad can say "click on any item you are interested in", then "Thank you for your selection. The information you requested will be sent to you". When the advertiser receives the click data, the advertiser can follow up with a mailer to the viewer. This would allow even "no-spot" ads to be run, to make it easier for advertisers who do not create interactive ads to nevertheless get interactive responses from viewers. As a further example, the "no-spot" data can be sent to the advertiser's Web response site in real time, and the advertiser can follow up with a response delivered as an AVTEF page in real time that is displayed on the viewer's screen.

While there has been many proposals for remote pointing devices to operate interactive TV, they all generally require the production of new hardware, such as, for example, optical beam pointers, light pens, joysticks, thumbwheels, mice, cursor discs, etc., which add to the cost of the system, and also require the distributor (cable TV companies) to distribute new hardware to thousands of customers and train them to use it. In another aspect of this invention, described below, the standard remote control can be adapted to function like a pointing device for interactive TV functions, so that no new hardware needs to be distributed and little training of viewers to use it is required.

As shown in FIG. 8, standard types of remotes 80 in common use have 4 directional arrows 81, 82, 83, 84 (<, ^, >, v ) and a Select button 85. If they are of the older type that does not have Up/Down and Left/Right directional buttons, the Up/Down Volume and Up/Down Channel buttons can be adapted for on-screen directional movements. The current types of conventional set top boxes (STBs) that are widely deployed use IR beam transmission from the standard remote to send signals to the STB. When a button on the remote is pressed, an IR pulse signal is emitted that is detected by an IR sensor at the STB. The STB detector software decodes the received signal and outputs the corresponding control signals to control the STB in accordance with the button pressed. In order to prevent users from pressing buttons too quickly and getting lost as to which control signal they are sending, the detector program has a time lapse threshold that ignores a signal if it is pressed too quickly after a previous one.

By downloading a software utility to the STB from the cable head-end, the software threshold can be shortened to allow users to press a series of button presses in sequence and have them detected by the STB. In addition, the detector program can be modified to interpret a directional button press in a selected mode to be interpreted as a small incremental jump in that direction. In this manner, rapid pressing of the 4 directional buttons can move a screen cursor in jumps in the 4 directions. The on-screen cursor can thus be moved to any position on the TV screen. For diagonal movement, the user can press a combination of two perpendicular directional buttons to move the cursor in a "staircase" fashion. In the example shown in FIG. 8, pressing the Right, Up, Right, Up, Up, Up and Right arrow buttons moves an on-screen cursor C from its present position to reach a target position T of a "gift" held by a clown on the screen. When the viewer presses the Select button 85, an interactive effect associated with the "gift" can be triggered, such as a "You Have Won . . . " display. For older analog STBs or early digital STBs in which the detector function is implemented in a circuit board, the user would have to turn in their STB for upgrade or insertion of a replacement board. However, this would allow the embedded hardware costs in older STBs to extend to fuller cost recovery.

Figure 9:
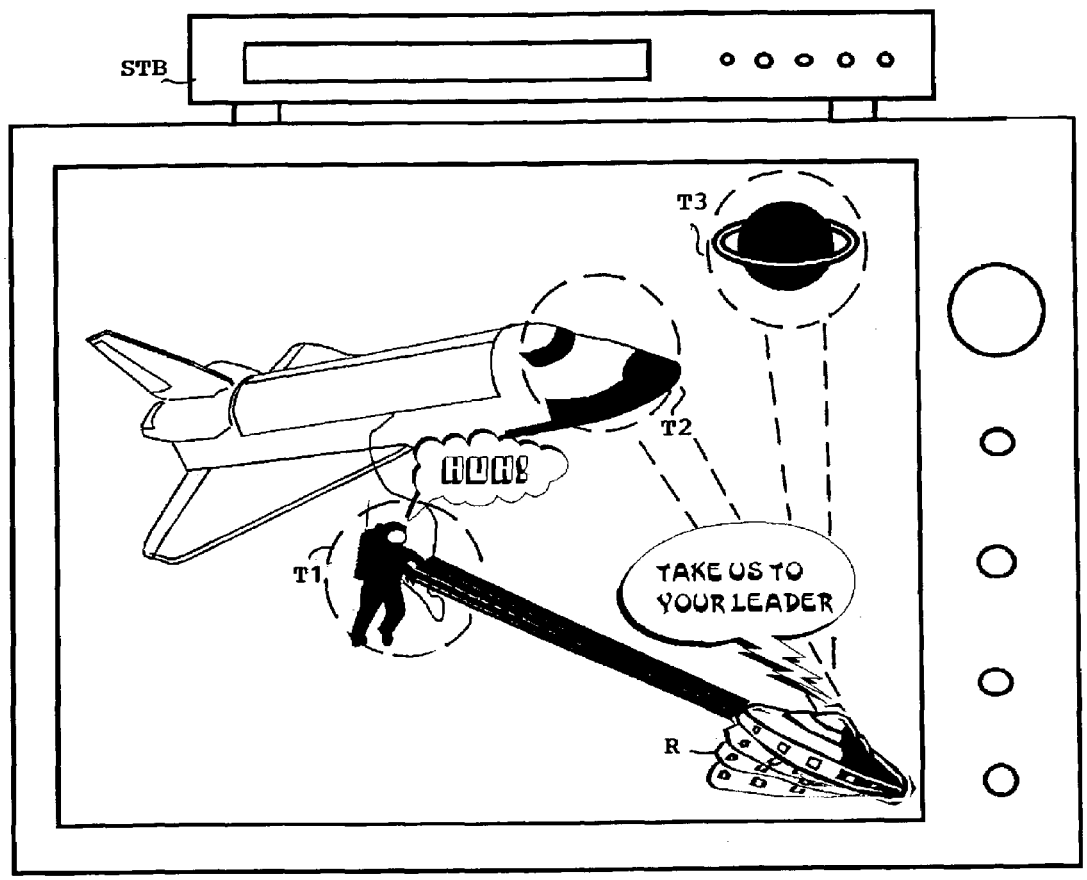
FIG. 9 is a schematic illustration of using a modified TV remote control unit to point to hot spots by aiming a vector ray at a selected hot spot.

Another method to adapt the standard remote control pointing to "hot spots" in an interactive TV program is to use a type of vector cursoring. In the example shown in FIG. 9, the interactive TV program has a graphic image of a flying saucer that serves as a reference point R in the lower right hand corner of the TV screen. One end of the graphic remains fixed in the corner of the TV screen, while the other end pivots 90 degrees from horizontal to vertical. By pressing the "Up" or "Down" buttons on a standard TV remote control, the viewer causes the free end of the graphic to move up or down in small increments enabling it to "point" at objects in the TV program as they are displayed on the screen.

When the free end of the graphic "points" at an object the viewer wishes to target, T1, T2, T3, etc., the viewer can press the "Enter" key on the remote and cause a vector graphic (in this example, a shot from a ray gun) to be overlaid on the video content and to "jump" across the TV screen. The viewer may be asked to locate and target certain objects in the video content that have been associated with "hot spots". When the viewer accurately aims the "pointer", presses "Enter" and causes the vector graphic to intersect the targeted object associated with a "hot spot", an amusing graphic (in this example, a thought or speech "balloon") or sound is overlaid on the video content. This may also result, for example, in the viewer gaining a score assigned to the targeted object. A tally of the viewer's score may be maintained by the interactive TV utility executed by the processor in the set top box. After the game is completed, the viewer's total score may be sent to the cable headend server, where it is recorded and sent to the sponsor of the interactive TV game. The sponsor can then send notification of a prize to the viewer. The reference point and vector ray may be a whimsical object such as a snake or frog that sends a tongue out to a target hot spot.

Another example consists of a graphic overlay (such as the flying saucer) which functions as a cursor the viewer can move in small increments either horizontally or vertically across the TV screen by sequentially pressing the four directional buttons on the remote or diagonally across the TV screen by pressing a combination of two perpendicular directional buttons to move the cursor in a "staircasing" fashion. When the "cursor" intersects an object in the video content associated with a "hot spot", the viewer can "click" on the object by pressing on the "Enter" button and cause a graphic or sound to be overlaid on the video or cause the interactive TV application to launch a Web page associated with the object. Alternatively, merely the intersection of the "cursor" with an object associated with a "hot spot" could cause a graphic or sound to "pop-up" without the necessity of pressing on "Enter" to "click" on the object.

Interactive TV Game Programs

In the present invention, interactive TV games may also be played by enabling viewers to interact with images in existing television shows and commercials using a standard television remote control to manipulate a cursor on the TV screen. The games, rules, playing instructions and demos may be selected from the offerings on a "Base" or "Home" page of the cable TV channels, such as in an electronic program guide (EPG), "walled garden" or virtual channel where viewers must go to launch the games, see their scores and collect prizes. As an example, an interactive crossword puzzle game application ("iCWP") is described below wherein (i) the clues and grid are displayed on an EPG, (ii) images representing the answers are found in existing TV shows or commercials, and (iii) the software applications, graphics, data and video content required for playing the games are delivered to and stored in a set top box and viewers use a TV standard remote to control a cursor and interact with the images.

Figure 10:
FIG. 10 illustrates an example of an on-screen display offering an interactive TV game program in an electronic program guide (EPG).

Referring to FIG. 10, viewers can access the iCWP by selecting the "Crosswords" hot spot 100 in an EPG using a standard remote control to activate the EPG's conventional number sequencing or toggling function. In FIG. 11, the viewer's selection launches a graphic 110 displaying a crossword puzzle grid and text describing related clues (the "iCWP Page"), as well as interactive text, icons or buttons used to activate games and demos and to control game features such on-screen clues and "helpers". In addition, the iCWP Page may also display still or video advertisements 111 associated with, and paid for by, sponsors of the iCWP. The iCWP Page is displayed using conventional technology for displaying graphics, text and video on an EPG.

Periodically, new iCWP clues, answers and the frame data and screen coordinates for the video images corresponding to answers are downloaded from the TV system's head-end to the viewer's set top box. Each new iCWP appears as a blank grid. Answers are overlaid on the grid in transparent text with the letters located in the boxes corresponding to each answers' respective across and down clues. The iCWP Page identifies which TV shows and commercials contain images corresponding to the answers, and each clue contains an "(M or S)" or "(C)" indicating whether the answer is found in a TV movie or show or a TV commercial, respectively. For example, in FIG. 11, "Across Clue" number 3 states "Goddess of Victory" as the clue and the "(M)" signifies that it appears in a movie. The answer "NIKE" appears in the crossword spaces for "3 Across". The viewer can fix the answer correctly by finding a hot spot in a movie which corresponds to the word "NIKE".

Using conventional EPG technology for channel selection and navigating the EPG, viewers of the iCWP Page are offered the following options:

Demo: This option sends the viewer to a separate TV channel (actual or virtual) or video on demand server displaying an animated or video demo describing the rules and showing how to complete the puzzle. The demo, as well as the TV shows and commercials may be displayed real-time from the TV system's head-end or downloaded to, and played from, a storage device in the viewer's set top box.

Play: This option launches the iCWP and prompts the viewer to select whether (i) to play when the TV show is scheduled to air, (ii) record the show for later viewing on a PVR, video cassette recorder or other storage device, or (iii) order the show for immediate viewing from a video on demand server. When a selection has been made, the iCWP configures the set top box to accept commands from the viewer's remote enabling it to manipulate the cursor after a "trigger" is delivered with the video stream to the set top box at the beginning of the TV show or commercial containing the answer to a clue. The cursor is overlaid on the video content and can be configured in the shape of a sponsor's logos, products or mascots. The viewer can toggle the cursor function off and on by pressing a designated button on the remote while viewing the show or commercial.

Clue Helper: This option helps the viewer complete the iCWP by displaying an on-screen prompt such as the word "Crosswords" when a clue answer is present or other clues and haloed images corresponding to correct answers while a TV show or commercial identified on the iCWP Page is aired. When selected, the clues and halo "helpers" are displayed as overlays when a TV show or commercial a viewer elects to view airs. The viewer can toggle the "helper" function off and on by pressing a designated button on the remote while viewing the show or commercial.

Hard Copy of Puzzle: This option permits viewers with a set top box capable of output to a printer to produce a paper copy of the crossword puzzle grid and clues.

Viewers who have selected "Play" must watch the corresponding TV shows or commercials, "click" on each image identified by a clue and return to the iCWP Page to view the completed, or partially completed, puzzle. During the airing of the shows and commercials, "clicks" on images corresponding to both correct and incorrect answers cause the display of graphic overlays and/or audio responses giving viewers instant feedback, such as "Correct" or "Sorry, try again."

Figure 12:
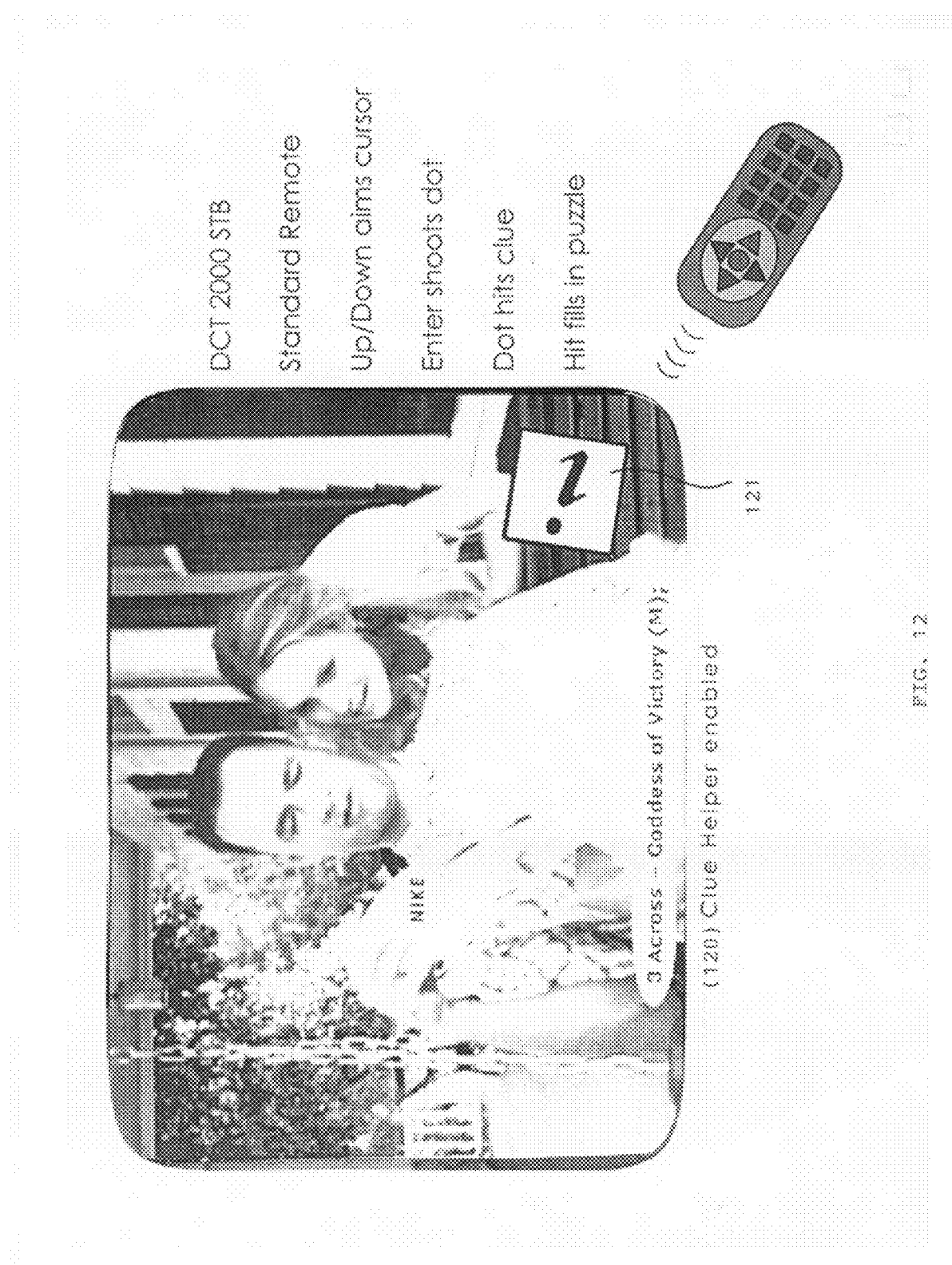
FIG. 12 illustrates using a standard remote control in conjunction with an on-screen display to be used in the interactive TV game of "Crosswords".
Figure 13:
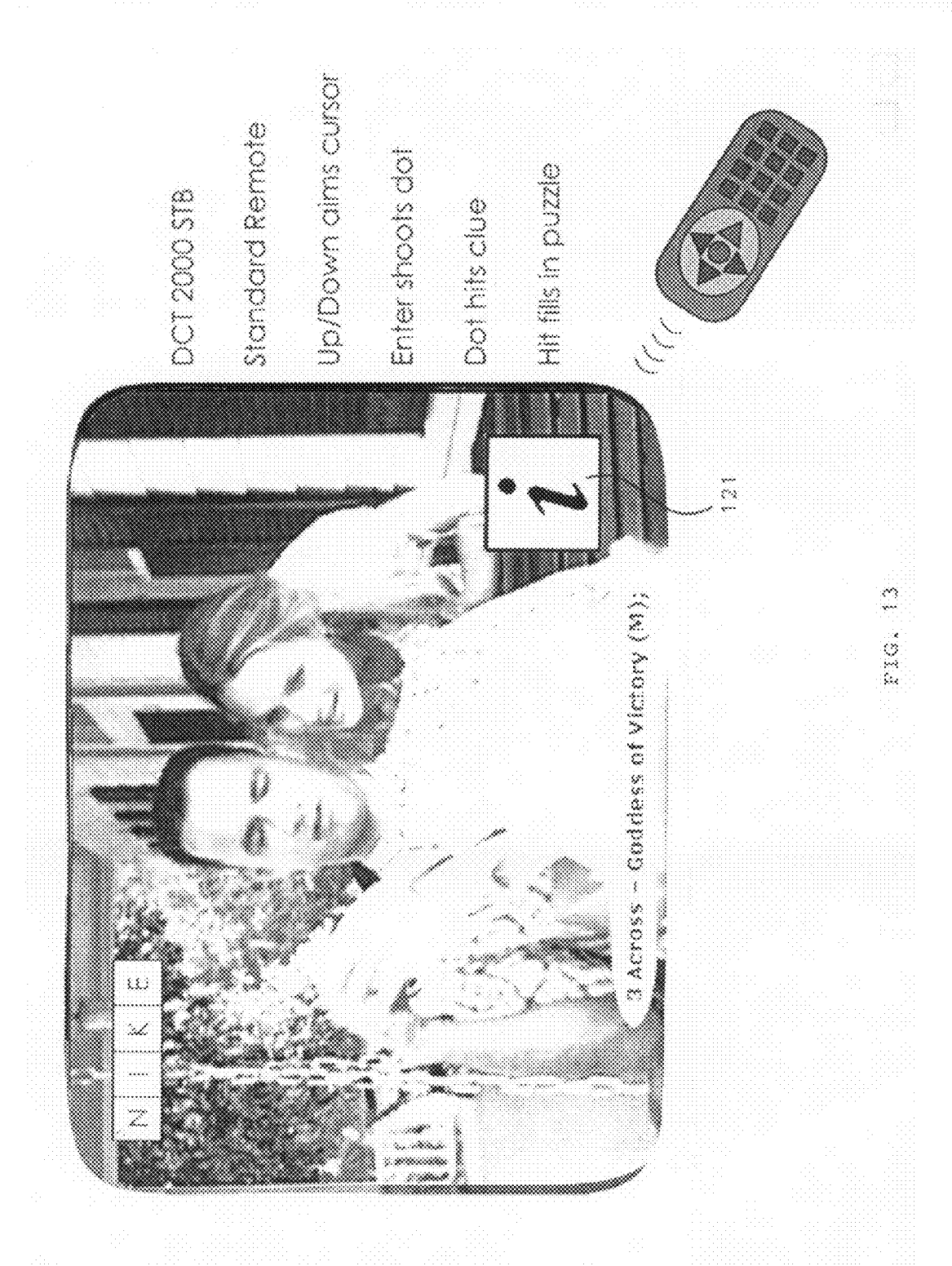
FIG. 13 illustrates using the standard remote control to correctly locate the object in the on-screen display for use in the interactive TV game of "Crosswords".

In FIG. 12, the viewer may be watching the movie "Forrest Gump" during the scene when he pulls a new NIKE™ sneaker out of a box. A Clue Helper prompt 120 for "Crosswords" is displayed at the bottom of the display to indicate that an object in the scene corresponds to a clue in the Crosswords game the viewer has selected to play. Using the remote, the viewer can aim at the shoe by using the directional arrows to tilt the arrowhead 121 of the interactive "i" icon at incremental angles until it is pointing in the direction of the sneaker. Pressing the "Enter" or "Select" key causes the interactivity program to compare the selected angle for the pointing function of the remote control to the correct angle for pointing at the corresponding hot spot object in the scene, i.e., the sneaker. If the angle corresponds to a correct answer of a Crosswords clue, the interactivity program overlays a display of the correct answer on the object, here "3 Across, NIKE" on the sneaker shown in the scene, as shown in FIG. 13.

Viewers must return to the EPG page for the Crosswords puzzle (FIG. 11) to see correct answers displayed on the crossword puzzle grid. Each time the viewer "clicks" on a correct answer the corresponding transparent text overlaid on the grid on the iCWP Page changes to a color that is visible on the viewer's TV screen, thus filling in the puzzle. Text relating to unanswered, or incorrectly answered clues, remain transparent. In games based upon accumulating points for each correct click, the number corresponding to the player's total score appears on the iCWP Page. A viewer who does not use Clue Helpers may receive a higher score for each clue answer correctly found. In this manner, the viewer proceeds to fill in the answers to the Crosswords puzzle.

Upon successful completion of the crossword puzzle, the EPG interactivity program is configured to display an "Award page" offering viewers prizes, premiums or the opportunity to request additional information about, or to purchase, the advertiser's products or services. Selection and award fulfillment can be accomplished using conventional EPG selection and navigation technologies, as well as existing technologies for conducting commerce through interactive television or linking to the Internet. Additionally, TV systems with a back channel to the head-end can be configured to permit advertisers to receive click stream data revealing viewing habits and interest in advertisers' products.

One knowledgeable in the field of interactive television and/or interactive multimedia applications will understand that the invention can also be applied in equivalent applications, such as the following:

(i) launched from any actual or virtual television channel, as well as "walled gardens";

(ii) embodied in any television system capable of storing (either in the viewer's set top box or at the head-end of a TV system having a back channel) applications, data and graphics that permit interaction with images in television shows and commercials;

(iii) operated with any pointing device capable of functioning with such system; and (iv) used to play any game or other application where viewers interact with images in existing television shows and commercials, e.g. treasure hunts where listed items are images found in shows and/or commercials, "tag" type games where viewers score points by "tagging" characters appearing on screen within a limited time period, educational games where viewers "click" on the correct object in a group of objects or trivia games where "clicks" on characters or objects launch text messages.

Additionally, it will be understood that there are a variety of methods for placing and displaying correct answers or a viewer's score on the iCWP Page other than switching from transparent to readable text as described above.

Although the invention has been described with reference to the above-described embodiments and examples, it will be appreciated that many other variations, modifications, and applications are possible and are to be included in the invention, as defined in the following claims.

The invention claimed is:

1. A method for converting television (TV) content to an interactive TV game program transmitted on a TV system, comprising:
   determining a mapping between an object and a hot spot in an image display frame of a TV program;
   determining a linkage between the hot spot in the image display frame of the TV program to a correct answer in an interactive TV game program;
   receiving input through a pointer unit to point at the image display frame of the TV program; and
   responsive to the input pointing at the hot spot in the image display frame of the TV program, indicating the correct answer in the interactive TV game program via the linkage wherein the interactive TV game program is a crossword puzzle in which correct answers to clues provided in the crossword puzzle are found in TV programs on other TV program channels of the TV system.

2. The method of claim 1, wherein the interactive TV game program is operated by a remote control unit as the pointer unit operable with a set-top box.

3. The method of claim 2, wherein the remote control unit has keys for at least directional arrow functions and a "Select" or "Enter" function, and the set-top box has a detection module for detecting pressing of the keys as pointing commands.

4. The method of claim 1, wherein the hot spot is mapped by its coordinate location in the image display frame of the TV program.

5. A method for converting television (TV) content to an interactive TV game program transmitted on a TV system, comprising:
   operating an interactive TV game program;
   determining a mapping between an object and a hot spot in an image display frame of a TV program;
   determining a linkage of the hot spot in the image display frame of the TV program to entry of a correct answer in the interactive TV game program;
   receiving input through a pointer unit to point at the image display frame of the TV program; and
   responsive to the input pointing at the hot spot associating the hot spot object, via the linkage, with the correct answer,
   wherein the interactive TV game program is a crossword puzzle in which correct answers to clues provided in the crossword puzzle are found in TV programs on other TV program channels of the TV system.

6. A method according to claim 5, wherein upon finding a hot spot object in the TV program that corresponds to the correct answer, the pointer unit is used to "click" on the object, and the corresponding answer is entered in the crossword puzzle.

7. A method according to claim 6, wherein when the pointer unit is used to "click" on the correct answer, transparent text for the correct answer overlaid on the crossword puzzle is changed to a darkened color on a TV display.

8. A method according to claim 7, wherein the interactive TV game program offers on-screen prompts or highlighting of clues to facilitate play.

9. A system for converting television (TV) content to an interactive TV game program comprising:
   a processor configured to receive compressed TV content and convert the compressed TV content into a uncompressed TV content, wherein the uncompressed TV content comprises a TV program;
   a random access memory (RAM) configured to store at least:
      an interactive TV game program, comprising:
         a mapping specifying one or more display locations of one or more objects in the TV program, individual of the one or more objects corresponding to a hot spot in an image display frame of the TV program, and
         one or more linkages, each linkage relating the hot spot and a correct answer in the interactive TV game program;
      a pointer unit for pointing at the hot spot in the image display frame of the TV program; and
   wherein, responsive to input pointing at the hot spot object in the image display frame of the TV program, the interactive TV game program is configured to utilize the linkage relating to the hot spot to enter the correct answer in the interactive TV game program, and
   wherein the interactive TV game program is a crossword puzzle game in which correct answers to clues provided in the crossword puzzle game are found in TV programs on other TV program channels of the TV system.

10. A system according to claim 9, wherein the pointer unit is a remote control unit configured to operate with a set-top box.

11. A system according to claim 10, wherein the remote control unit has keys for at least directional arrow functions and a "Select" or "Enter" function, and the set-top box has a detection module for detecting pressing of the keys as pointing commands.

12. A system according to claim 10, wherein the interactive TV game program receives key presses of the directional arrow functions to toggle among a plurality of hot spot objects in the image display frame.

13. A system according to claim 10, wherein the interactive TV game program detects a series of directional arrow key presses as corresponding directional increments in a staircase fashion to point at a target hot spot object in the image display frame.

14. A system according to claim 10, wherein the interactive TV game program detects a series of directional arrow key presses and causes an on-screen cursor in a fixed reference point in a TV display area to aim in corresponding directional increments at a target hot spot object in the image display frame.

15. A system according to claim 9, wherein the hot spot objects are specified as marker positions in an HTML-type "page" configured to display the hot spot objects in the TV program.

16. A system according to claim 9, wherein the interactive TV game program is presented in a "Base" or "Home" page for the TV system.

17. A system according to claim 16, wherein the "Base" or "Home" page is an electronic program guide ("EPG").

\* \* \* \* \*

UNITED STATES PATENT AND TRADEMARK OFFICE
CERTIFICATE OF CORRECTION

PATENT NO. : 7,577,978 B1  Page 1 of 1
APPLICATION NO. : 10/463949
DATED : August 18, 2009
INVENTOR(S) : Wistendahl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1380 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,577,978 B1 | Page 1 of 1 |
| APPLICATION NO. | : 10/463949 | |
| DATED | : August 18, 2009 | |
| INVENTOR(S) | : Wistendahl et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1352 days.

Signed and Sealed this
Twenty-sixth Day of April, 2011

David J. Kappos
*Director of the United States Patent and Trademark Office*